United States Patent Office 2,861,064
Patented Nov. 18, 1958

---

2,861,064 o-HYDROXY DIAZO COMPOUNDS OF THE NAPHTHALENE SERIES

Fritz Suckfull, Leverkusen, Rolf Putter, Dusseldorf, and Horst Nickel, Koln-Stammheim, Germany, assignors to Farbenfabriken Bayer Aktiengesellschaft, Leverkusen, Germany, a corporation of Germany No Drawing. Application August 8, 1956
Serial No. 602,936

Claims priority, application Germany August 18, 1955

6 Claims. (Cl. 260—141)

The present invention relates to o-hydroxy diazo compounds and to a process for their manufacture; more particularly it relates to o-hydroxy diazo compounds of the naphthalene series which are substituted by an aryl azo grouping or by an arylsulfonated hydroxy group and to a process for making the same.

It is an object of the present invention to provide new o-hydroxy diazo compounds of the naphthalene series. It is a further object to provide new o-hydroxy diazo compounds of the naphthalene series which are suitable as intermediate products for the manufacture of azo dyestuffs. It is another object to provide a process for the production of said o-hydroxy diazo compounds.

According to the invention new o-hydroxy diazo compounds of the naphthalene series technically hitherto unobtainable are produced by treating diazo naphthalenes which have in o-position to the diazo group a sulfonic acid group and are substituted by an aryl azo group or a hydroxyl group esterified with an aryl-sulfonic acid, with oxidizing agents such as chlorine water, hydrogen peroxide or sodium peroxide in an alkaline medium.

This result is surprising, since it was not to be expected that under the reaction conditions required according to experience for the exchange of the sulfonic acid group in o-position to the diazonium group for the hydroxyl group, i. e. in the presence of a substantial excess of oxidizing agents and at a high concentration of alkali, the reaction with diazo naphthalene sulfonic acids to be used according to the invention which contain an arylazo group or an aryl-sulfonated hydroxy group would succeed.

Suitable diazo naphthalenes having in o-position to the diazo group a sulfonic acid group according to the invention are for example the O-benzene-sulfonic acid esters of 2 - diazo - 5 - hydroxy-naphthalene-1,7-disulfonic acid or of 1-diazo-8-hydroxy-naphthalene-2,4-disulfonic acid, or diazo-monoazo dyestuffs containing as the end component diazotized 1 - amino-naphthalene-2-sulfonic acids such as for example the monoazo dyestuffs obtainable by coupling of diazotized 1-amino-benzene-4-sulfonic acid, 2-amino-naphthalene-8-sulfonic acid or 2-aminonaphthalene-4,8-disulfonic acid with 1-amino-naphthalene-2-sulfonic acid and subsequent diazotizing of the amino group.

The new compounds obtainable according to the process of the invention are suitable inter alia as intermediate products for the manufacture of azo dyestuffs. Thus, they can be coupled with azo compounds e. g. with phenols, as known from literature (Richter, "Organic Chemistry," 3rd ed., New York, 1952, page 436) to form azo dyestuffs.

The following examples are given for the purpose of illustrating the invention, the parts by weight and the parts by volume being in the ratio of grams to millilitres.

Example 1

40.7 parts by weight of the monoazo dyestuff obtainable by acetic acid coupling of diazotized 1-amino-benzene-4-sulfonic acid with 1-amino-naphthalene-2-sulfonic acid are dissolved neutral in 400 parts by volume of water. A solution of 7 parts by weight of sodium nitrite is added and subsequently at 20° C. 20 parts by volume of sulfuric acid 40° Bé. After about one hour the diazo compound thus obtained is isolated and introduced into a mixture of 170 parts by volume of a 20 percent aqueous sodium carbonate solution, 145 parts by volume of 15 percent chlorine water and 55 parts by weight of sodium chloride whereby the temperature rises to 45° C. After one hour the reaction product is isolated and washed with a little 20 percent sodium chloride solution. Orange-yellow crystals of the sodium salt of the o-hydroxy-diazo compound corresponding to the following formula

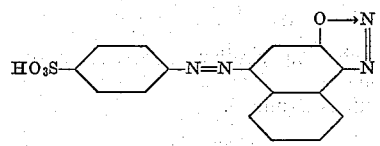

are obtained which sparingly dissolve in water with a yellow coloration and which can be dried at 55° C. without decomposition.

Example 2

53.7 parts by weight of the monoazo dyestuff obtainable by acetic acid coupling of diazotized 2-amino-naphthalene-4,8-disulfonic acid with 1-amino-naphthalene-2-sulfonic acid are dissolved neutral in 800 parts by volume of water. A solution of 7 parts by weight of sodium nitrite is added and subsequently at 20° C. 35 parts by volume of sulfuric acid 40° Bé. The diazo compound isolated after about one hour is introduced into a mixture of 190 parts by volume of a 20 percent aqueous sodium carbonate solution and 150 parts by volume of 15 percent chlorine water whereby the temperature rises to 48° C. After 20 minutes the reaction product is isolated and washed with a little 20 percent sodium chloride solution. Orange-yellow crystals of the sodium salt of the o-hydroxy diazo compound corresponding to the following formula

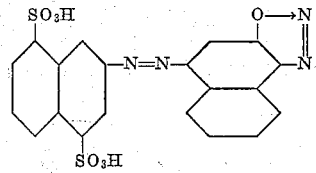

are obtained. The compound dissolves slightly in water with a yellow coloration.

Example 3

53.7 parts by weight of the monoazo dyestuff obtained from diazotized 1-amino-naphthalene-6,8-disulfonic acid and 1-amino-naphthalene-2-sulfonic acid are diazotized at 10° C. in a similar manner as indicated in Example 2. The isolated diazo compound is introduced into a mixture of 190 parts by volume of a 20 percent sodium carbonate solution and 110 parts by volume of 15 percent chlorine water, and the reaction product is isolated after stirring over night. The o-hydroxy-diazo compound of the following formula

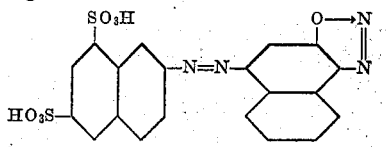

is obtained.

The product has similar properties to those of the isomeric compound obtained according to Example 2.

Example 4

53.7 parts by weight of the monoazo dyestuff from diazotized 2-amino-naphthalene-5,7-disulfonic acid and 1-amino-naphthalene-2-sulfonic acid are diazotized at 20° C. with 7 parts by weight of sodium nitrite and 21 parts by volume of sulfuric acid 40° Bé. The diazonium salt solution thus obtained is introduced into a mixture of 240 parts by weight of sodium chloride, 210 parts by volume of a 20 percent sodium carbonate solution and 108 parts by volume of 15 percent chlorine water whereby the temperature rises to 30° C. The reaction product is isolated after 30 minutes. A product of the formula

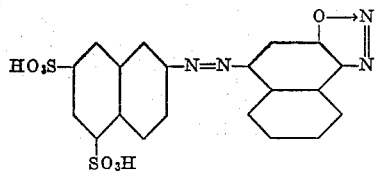

is obtained showing similar properties to those of the isomeric o-hydroxy diazo compounds obtained according to Examples 2 and 3.

Example 5

31.9 parts by weight of 2-amino-5-hydroxy-naphthalene-1,7-disulfonic acid are dissolved in 70 parts by volume of water and 31 parts by volume of sodium hydroxide 40° Bé. After cooling the solution to 0–5° C., 32.5 parts by weight of benzene-sulfochloride are added with stirring. When the reaction is completed, the reaction solution is treated with concentrated hydrochloric acid until the O-benzene-sulfonyl product precipitates. It is isolated without addition of salt.

For further treatment the paste is dissolved at room temperature in 170 parts by volume of water and the required amount of sodium carbonate (about 7 parts by weight). After the addition of 35 parts by volume of hydrochloric acid 19° Bé. the mixture is diazotized at about 10° C. with a solution of 7 parts by weight of sodium nitrite. Without intermediate isolation, a mixture of 208 parts by volume of a 20 percent sodium carbonate solution and 124 parts by volume of 15 percent chlorine water cooled to 10° C. is added to the diazonium salt solution whereby the temperature rises to 30–40° C. The separation of the diazo oxide in a crystalline form begins already in the warm. The product thus obtained corresponds in the state of the free acid to the following formula

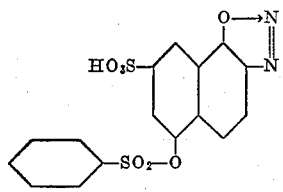

it is expediently protected from light. The compound has a yellow color, is slightly soluble in water and sensitive to light.

The diazo oxide is also formed if instead of chlorine water 21 parts by volume of 30 percent hydrogen peroxide or a solution of 11.2 parts by weight of sodium peroxide in 150 parts by volume of water are added along with the sodium carbonate solution to the diazonium salt solution.

40.6 parts by weight of the o-hydroxy-diazo compound of the above formula are stirred with 200 parts by volume of water. To the mixture there are added in as brief intervals as possible 42 parts by volume of 25 percent ammonia and an ammoniacal cuprous salt solution which is prepared as follows:

25 parts by weight of crystalline copper sulfate are dissolved in 100 parts by volume of water, 42 parts by volume of 25 percent ammonia are added with cooling at 0–10° C. and subsequently a solution of 7 parts by weight of hydroxylamino hydrochloride in 25 parts by volume of water which had been treated in the cold with 10 parts by volume of sodium hydroxide 40° Bé.

The reaction sets in with evolution of gas and change of shade. When the reaction is terminated, the separation of the product thus obtained is completed by the addition of approximately 5 parts by weight of sodium chloride. The copper complex of the monoazo dyestuff having the following formula is obtained:

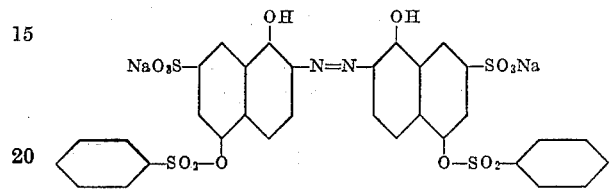

The dry dyestuff is a dark powder which dissolves in water with a violet coloration and dyes wool in violet shades.

Example 6

31.9 parts by weight of 1-amino-8-hydroxy-naphthalene-2,4-disulfonic acid are dissolved in 80 parts by volume of water and 31 parts by volume of sodium hydroxide 40° Bé. and reacted with 32.5 parts by weight of benzene-sulfochloride as indicated in Example 5. The ester thus formed is isolated from an acid medium with sodium chloride and then diazotized in usual manner. The barely soluble diazonium salt precipitates and is isolated without addition of salt. The conversion into the diazo-oxide is carried out in a similar manner, as indicated in Example 5 with 180 parts by volume of a 20 percent sodium carbonate solution and 100 parts by volume of 15 percent chlorine water, a rise of the temperature above 30° C. being obviated by the addition of ice. The o-hydroxy-diazo compound thus obtained corresponds in the state of the free acid to the formula

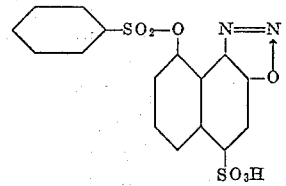

it represents yellow crystals which are sparingly soluble in water.

We claim:
1. An o-hydroxy-diazo compound corresponding to the formula

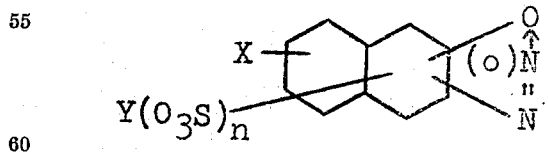

wherein X stands for a radical selected from the group consisting of sulfophenyl-azo, sulfonaphthyl-azo and phenyl sulfonyl hydroxy group, Y is a member selected from the group consisting of hydrogen and sodium, when $n$ is an integer of 1 and hydrogen when $n$ is an integer from 0 to 1.

2. An o-hydroxy-diazo compound corresponding to the formula

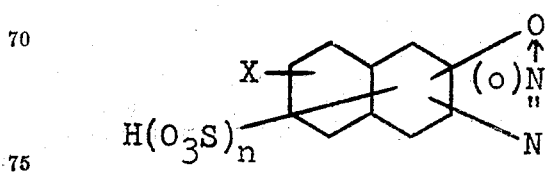

wherein X means a sulfophenyl-azo group and *n* is an integer from 0 to 1.

3. An o-hydroxy-diazo compound corresponding to the formula

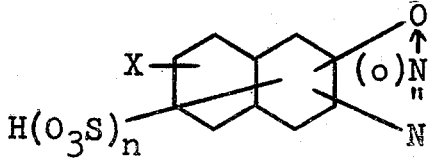

wherein X means a phenyl-sulfonyl hydroxy group and *n* is an integer from 0 to 1.

4. The o-hydroxy-diazo compound corresponding to the formula

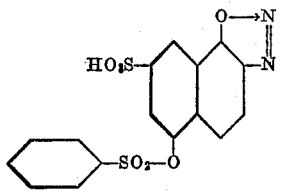

5. The o-hydroxy-diazo compound corresponding to the formula

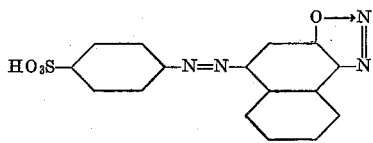

6. Process of preparing o-hydroxy-diazo compounds of the naphthalene series which comprises treating a diazo-naphthalene bearing in o-position to the diazo group a sulfonic acid group and being substituted by radicals selected from the group consisting of sulfophenyl-azo, sulfo-naphthyl-azo, and phenyl-sulfonyl hydroxy radicals, with an oxidizing agent selected from the group consisting of sodium peroxide, hydrogen peroxide and chlorine water, in a medium which has been made alkaline by sodium carbonate.

References Cited in the file of this patent
UNITED STATES PATENTS

| | | |
|---|---|---|
| 2,767,092 | Schmidt | Oct. 16, 1956 |
| 2,778,815 | Ackermann et al. | Jan. 22, 1957 |